United States Patent Office 2,867,646
Patented Jan. 6, 1959

2,867,646
COMPLEX ARYLPHOSPHONATES

Richard R. Whetstone, Denver, Colo., William J. Raab, Haworth, N. J., and Walter E. Hall, Modesto, Calif., assignors to Shell Development Company, New York, N. Y., a corporation of Delaware No Drawing. Application April 9, 1956
Serial No. 576,831

7 Claims. (Cl. 260—461)

This invention relates to a new class of phosphorus-containing esters which have been found to be particularly useful as insecticides.

The compounds of the invention are complex phosphonates which are represented by the formula

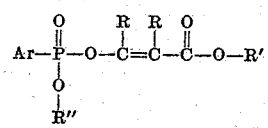

wherein Ar is an aryl radical, R is a member of the class consisting of hydrogen and alkyl radicals, R' is an alkyl radical and R'' is an alkyl radical containing up to 6 carbon atoms.

By aryl radical is meant any aromatic radical attached directly to the phosphorus atom by a direct bond from the phosphorus atom to a carbon atom of the aromatic ring of the aryl radical. The aryl radical may be unsubstituted; it may be substituted by one or more hydrocarbyl groups, and/or it may be substituted by one or more non-hydrocarbon groups, such as amino groups, or the like. The aryl radical may be mononuclear—i. e., containing the phenyl structure—or it may be polynuclear—i. e., containing the naphthyl or like structure. Of the hydrocarbon-substituted aryl radicals, the alkyl-substituted phenyl radicals are preferred. Examples of this preferred sub-genus of aryl radicals include the 2-methylphenyl, 3-methylphenyl, 4-methylphenyl, 4-ethylphenyl, 2,5-dimethylphenyl, 4-isopropylphenyl, 2,4,6-trimethylphenyl and like aryl radicals. Of the non-hydrocarbyl-substituted aryl radicals, the amino-substituted phenyl radicals—particularly the mono- and dialkylaminophenyl radicals—are preferred, since the sub-genus of the compounds of this invention which contain such an aminophenyl group attached directly to the phosphorus atom have been found to have excellent residual toxicity as insecticides. It is preferred that the alkyl group or groups of such aminophenyl groups be lower alkyl groups—i. e., containing not more than about 6 carbon atoms each. While the substituent amino group may be linked to any carbon atom of the aromatic ring, with respect to the carbon atom of that ring directly linked to the phosphorus atom, it is preferred that the amino substituent group be in the position para- to the carbon atom of the aromatic ring linked directly to the phosphorus atom.

In the above formula, each R is the same or different and is hydrogen or methyl, ethyl, propyl, isobutyl, hexyl, 2-octyl, dodecyl, stearyl, or any other alkyl radical; R' is also any alkyl radical such as was exemplified for R; and R'' is an alkyl radical containing up to 6 carbon atoms such as a methyl, ethyl, isopropyl, butyl, isopentyl, hexyl, or 3-hexyl radical.

The new compounds of the invention are prepared by reacting an alkyl ester of an alpha-chloro beta-oxo fatty acid with a dialkyl arylphosphonite, the reaction of which may be written as follows:

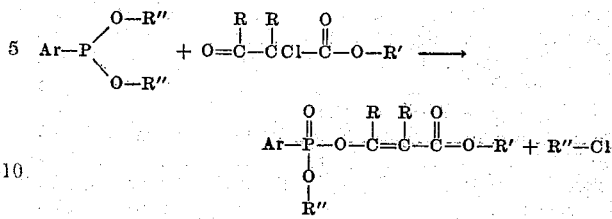

wherein Ar and the several R's are the same as noted above.

The reaction is effected by adding about an equimolar amount of the chloroester to the phosphonite, the addition usually being made slowly so as to avoid undue temperature increase of the reaction mixture from the exothermic heat of reaction. The reaction may be started with the reactants at an ordinary temperature of about 20° C. to 25° C., but for the most part is conducted at a temperature between about 60° C. and 150° C. In some cases, the starting of the reaction is assisted by application of heat, and especially if large quantities of reactants are used, cooling is employed to control the temperature within the desired range. The formed alkyl chloride is preferably removed from the reaction mixture to greater or lesser extent by application of sufficient vacuum so the chloride is boiled out. When the boiling points of the formed alkyl chloride and the chloroester reactant are fairly close together, use of a distillation column for removal of the alkyl chloride is advisable for best results. Some of the higher reactants are solids at ordinary temperature, but use of an inert solvent such as xylene enables a fluid reaction system to be realized. The reaction is effected under substantially anhydrous conditions. In order to insure completion of the reaction after addition of the chloroester, the reaction mixture is heated within the indicated temperature range for a reasonable time. The formed phosphonate is usually recovered by distillation under sufficiently low pressure that thermal decomposition is avoided. If desired, especially with higher compounds of the invention, crystallization or molecular distillation may be used for recovery of the phosphonates.

Preparation of typical, but non-limiting members of the class of new compounds of the invention are described in detail in the following examples wherein the parts are by weight.

EXAMPLE I

There were placed 150 parts (0.93 mole) of ethyl alphachloroacetoacetate in a reaction vessel fitted with a stirrer and 150 parts (0.93 mole) of dimethyl phenylphosphonite were added during a period of about one hour and ten minutes. The temperature of the reaction mixture rose to and was maintained at about 85° C. The reaction product was then subjected to low vacuum pumping at about 85° C. whereupon about 37 parts of material were removed. Distillation of the remaining reaction product gave 211 parts (83.5% yield) of methyl 1-carbethoxy-1-propen-2-yl phenylphosphonate boiling at 162–174° C. at 1 mm. pressure. The distilled product was a somewhat oily liquid soluble in benzene, in isopropyl alcohol and in acetone. The ester analyzed as follows:

|  | Found | Calculated |
|---|---|---|
| Percent carbon | 54.2 | 54.7 |
| Percent hydrogen | 6.3 | 6.3 |
| Percent phosphorus | 11.2 | 10.9 |

EXAMPLE II

Diethyl (p-dimethylaminophenyl)phosphonite (48.3 grams—0.2 mole) was added to methyl-2-chloroacetoacetate (30.1 grams—0.2 mole) over a 25-minute period. During the addition period the temperature rose spontaneously to 70° C. At the end of the addition period, the mixture was heated to 100° C. for two hours. During the second hour a vacuum of about 150 mm. of mercury was applied to remove the by-product ethyl chloride (10.3 grams—79.9% of theory). This crude reaction product was first stripped of low boiling materials at 105–115° C. and 0.001 mm. mercury pressure and then distilled in a molecular still to give the product ethyl 2-methoxycarbonyl-1-methylvinyl (p-dimethylaminophenyl)-phosphonate, having the following characteristics and analysis:

B. P. 154–156° C. at 0.001 mm. mercury
$n_D^{27.5}$ 1.5528
Yield 41.5 grams—63.4% of theory

| Analysis | Found | Calculated for $C_{15}H_{22}NO_5P$ |
|---|---|---|
| Carbon, percent w | 54.9 | 55.1 |
| Hydrogen, percent w | 6.7 | 6.77 |
| Nitrogen, percent w | 4.0 | 4.05 |
| Phosphorus, percent w | 9.4 | 9.47 |

Other compounds of the invention are prepared in similar fashion. For example, methyl 1-carbomethoxy-1-propen-2-yl phenylphosphonate is obtained by reacting methyl alpha-chloroacetoacetate with dimethyl phenylphosphonite; ethyl 1-carbethoxy-1-propen-2-yl phenylphosphonate is obtained by reacting ethyl alpha-chloroacetoacetate with diethyl phenylphosphonite; methyl 1-carbethoxy-1-ethen-2-yl 4-methylphenylphosphonate is obtained by reacting ethyl alpha-chloroformylacetate with dimethyl 4-methylphenylphosphonite; butyl 2-carbethoxy-2-penten-3-yl p-nitrophenylphosphonate is obtained by reacting ethyl alpha-chloro-alpha-propiopropionate with dibutyl p-nitrophenylphosphonite; hexyl 1-carbethoxy-1-propen-2-yl 2-ethylphenyl-phosphonate is obtained by reacting ethyl alpha-chloroacetoacetate with dihexyl 2-ethyl-phenylphosphonite; ethyl 2-carbethoxy-3-metyl-1-buten-1-yl p-chlorophenylphosphonate is obtained by reacting ethyl alpha-chloro-alpha-formyl-isovalerate with diethyl p-chlorophenyl phosphonite; isobutyl 1-carbisopentoxy-1-propen-2-yl 2,4,6-trimethyl-phenylphosphonate is obtained by reacting isopentyl alpha-chloroacetoacetate with di-isobutyl 2,4,6-trimethylphenylphosphonite; methyl 1-carbethoxy-1-propen-2-yl napthylphosphonate is obtained by reacting ethyl alpha-chloroacetoacetate with dimethyl naphthyl-phosphonite; ethyl 3-carbethoxy-2-tridecen-2-yl 4-(phenyl methyl amino)-phenylphosphonate is obtained by reacting ethyl alpha-chloro-alpha-acetolaurate with di-ethyl 4-(phenyl methyl amino)-phenylphosphonite; ethyl 1-carbomethoxy-1-nonen-2-yl phenylphosphonate is obtained by reacting methyl alpha-chloro-alpha-capryl-acetate with diethyl phenylphosphonite; and ethyl 17-carboethoxy-17-pentatriconten-18-yl phenylphosphonate is obtained by reacting ethyl alpha-chloro-alpha stearoyl-stearate with di-ethyl phenylphosphonite. The chloroester reactants can be obtained by reacting alkyl beta-oxo fatty acid esters with sulfuryl chloride according to the method described in J. Chem. Soc., vol. 123, page 1125 (1925). The dialkyl arylphosphonites are obtainable in known fashion by reacting a mol of aryl dichlorophosphine (Ar—PCl$_2$) with two mols of the alkanol in the presence of two mols of a basic hydrogen chloride acceptor such as pyridine or dimethylaniline.

Many of the complex arylphosphonates of the invention are liquids at ordinary temperatures of 20° C. to 25° C. although higher members are crystalline solids at such normal temperatures. The new compounds are very useful substances for a variety of applications such as additives for lubricating oils and greases, as plasticizers for vinyl resins and the like, and as raw materials or intermediates for synthesis of a variety of chemical products. The compounds have particular utility as insecticides because they possess outstanding properties when employed as contact insecticides. The compounds are highly toxic to insects, a term which is employed herein to include not only the members of the class Insecta, but also related or similar non-vertebrate animal organisms belonging to the allied classes of arthropods and including mites, ticks, spiders, wood lice, and the like.

The compounds of this invention can be employed for insecticidal purpose by the use of any of the methods which are conventionally employed in that art. For example, the compounds can either be sprayed or otherwise applied in the form of a solution or dispersion, or it can be absorbed on an inert, finely divided solid and applied as a dust. Useful solutions for application by spraying, brushing, dipping, and the like, can be prepared by using as the solvent any of the well-known inert horticultural carriers, including neutral hydrocarbons such as kerosene and other light mineral oil distillates of intermediate viscosity and volatility. Adjuvants, such as spreading or wetting agents, can also be included in the solutions, representative materials of this character being fatty acid soaps, rosin salts, saponins, gelatin, casein, long chain fatty alcohols, alkyl aryl sulfonates, long-chain alkyl sulfonates, phenol-ethylene oxide condensates, $C_{12}$ to $C_{20}$ amines and ammonium salts, and the like. These solutions can be employed as such, or, more preferably, they can be dispersed or emulsified in water and the resulting aqueous dispersion or emulsion applied as a spray. Solid carrier materials which can be employed include talc, bentonite, lime, gypsum, pyrophyllite and similar inert solid diluents. If desired, the compounds of the present invention can be employed as aerosols, as by dispersing the same into the atmosphere by means of a compressed gas.

The concentration of the compounds to be used with the above carriers is dependent upon many factors, including the particular compound utilized, the carrier employed, the method and conditions of application, and the insecticide species to be controlled, a proper consideration and resolution of these factors being within the skill of those versed in the insecticide art. In general, however, the compounds of this invention are effective in concentrations of from about 0.01 to 0.5% based upon the total weight of the composition, though under some circumstances as little as about 0.00001% or as much as 2% or even more of the compound can be employed with good results from an insecticidal standpoint.

When employed as an insecticide, a compound of this invention can be employed either as the sole toxic ingredient or the insecticidal composition or it can be employed in conjunction with the other insecticidally-active materials. Representative insecticides of this latter class include the naturally-occuring insecticides such as pyrethrum, rotenone, sabadilla, and the like, as well as the various synthetic insecticides, including DDT, benzene hexachloride, thiodiphenylamine, cyanides, tetraethyl pyrophosphate, diethyl-p-nitrophenyl thio phosphate, azobenzene, and the various compounds of arsenic, lead, and/or fluorine.

In the following example the insecticidal qualities of methyl 1-carbethoxy-1-propen-2-yl phenylphosphonate, and ethyl 2-methoxycarbonyl-1-methylvinyl (p-dimethylaminophenyl)phosphonate, typical compounds of the invention, are clearly demonstrated, with a comparison being made between the properties of these compounds and those of two other more or less closely related known compounds.

EXAMPLE III

The LD–50 values for methyl 1-carbethoxy-1-propen-2-yl phenylphosphonate, ethyl 2-methoxycarbonyl-1-methylvinyl (p-dimethylaminophenyl)phosphonate and the other compounds named in the table below were determined by spraying solutions containing different concentrations of the insecticide, in a neutral petroleum distillate boiling within the kerosene range, on Pinto bean plants infested with 2-spotted mite (*Tetranychus bimaculatus*). The LD–50 values given in the table represent the concentration in weight percent of the toxic agent in the solvent at which, under standard test conditions, a 50% mortality of the insects in each test was observed.

Table I

| Toxic agent | LD–50 |
|---|---|
| Methyl 1-carbethoxy-1-propen-2-yl phenylphosphonate | 0.002 |
| Ethyl 2-methoxycarbonyl-1-methylvinyl (p-dimethylaminophenyl)phosphonate | 0.0035 |
| Diethyl 1-carbethoxy-1-propen-2-yl phosphate | 0.03 |
| Parathion, diethyl p-nitrophenyl thionophosphate | 0.04 |

The foregoing results show that the compounds of the invention are some 10 to 20 times as effective as the other compounds.

EXAMPLE IV

The toxicity of a representative product of the invention against the common housefly (*Musca domestica*) was determined using the method described by Y. P. Sun, Journal of Economic Entomology, volume 43, page 45 et seq. (1950). The toxicity of the test compound was compared to that of alpha-chlordane. The toxicity of the test compound is expressed in terms of the relationship between the amount of alpha-chlordane required to produce 50% mortality of the test insects and the amount of the test material required to produce the same mortality. Assigning alphachlordane an arbitrary rating of 100%, the toxicity of the test material is expressed in terms of the toxicity index which compares the activity on a percentage basis with that of the alpha-chlordane. The results are shown in the following table:

Table II

| Compound | Toxicity index |
|---|---|
| Alpha-chlordane (standard for comparison) | 100 |
| Methyl 1-carbethoxy-1-propen-2-yl phenylphosphonate | 660 |

EXAMPLE V

In further tests, representative compounds of the invention were tested against other common insect pests, comparison being made to common insecticides widely used against such pests. Solutions or emulsions of the representative compounds were made up by employing acetone, or a neutral petroleum distillate lying within the kerosene range as the solvent. These solutions or emulsions were tested for toxicity against (a) the two-spotted spider mite (*Tetranychus bimaculatus*), (b) the pea aphid (*Macrosiphum pisi*), and (c) the Mexican bean beetle larva (*Epilachna varivestis*), by spraying groups of plants infested with the insects under controlled conditions which varied from test to test only in the identity of the toxic agent and its concentration. These toxicities were compared with the toxicity of (a) parathion, (b) nicotine, (c) the gamma isomer of hexachlorobenzene, all insecticides widely used for the destruction of the common insects tested. In each set of tests the conditions were directly comparable—i. e., the same test insect, same plant, environment, etc., were used and the concentration of active material in each case was the same. The toxicities of the test compounds are expressed in terms of a toxicity index, this index being determined as set out in Example IV. The results of the tests are set out in the following table.

Table III

| Test Insect | 2-spotted spider mite | | Mexican bean beetle larva |
|---|---|---|---|
| Standard | Parathion | Nicotine | Gamma benzene hexachloride |
| Test compound: | | | |
| Methyl 1-carbethoxy-1-propen-2-yl phenyl phosphonate | 430 | 480 | 935 |
| Ethyl 2-methoxycarbonyl-1-methylvinyl (p-dimethylaminophenyl)phosphonate | 100 | 270 | 1,060 |

EXAMPLE VI

The residual toxicity of methyl 1-carbethoxy-1-propen-2-yl phenyl phosphate was determined in comparison with diethyl 1-carbethoxy-1-propen-2-yl phosphate. Emulsible concentrates were prepared containing by volume: 25% toxicant, 65% xylene, 5% Triton X–155 emulsifier, and 5% Triton B–1956. Portions of the concentrates were mixed and shaken with water in such proportions as to give the concentrations tabulated below. The aqueous emulsions were sprayed in uniform fashion on the underside of two primary leaves of potted Pinto bean plants. This was accomplished by fastening the tips of the two leaves in a vertical position with the upper surfaces touching each other and rotating the plants on a turntable while applying the spray. One day after the spray applications were made, the plants were then infested with 2-spotted mites, *Tetranychus bimaculatus*. A mortality count of the mites was then made 24 hours later with the following results:

Table IV

| Toxic agent | Conc., weight percent | Percent mortality |
|---|---|---|
| Methyl 1-carbethoxy-1-propen-2-yl phenylphosphonate | 1.25 | 100 |
| | 0.25 | 71 |
| Diethyl 1-carbethoxy-1-propen-2-yl phosphate | 1.25 | 12 |
| | 0.25 | 16 |

EXAMPLE VII

The residual toxicity of ethyl 2-methoxycarbonyl-1-methylvinyl (p-dimethylaminophenyl)phosphonate to cotton boll weevils was determined as follows:

The top twelve inches of mature cotton plants (the area on which cotton boll weevils are active in feeding and laying eggs) were cut off and the cut stem was placed in a vessel of water. Three of these cut-stem plants were then sprayed. The spray was at a rate of approximately 6 gallons of total spray per acre of which 0.8 lb. was ethyl 2-methoxycarbonyl-1-methylvinyl (p-dimethylaminophenyl)phosphonate. Ten adult boll weevils were then placed on each cut-stem plant. They were enclosed in a screen which prevented their escape. Mortality counts were made 24 hours after the weevils were placed on the plants. Each succeeding day after the spray date, ten additional weevils were placed on the plants and mortality counts were made 24 hours later. Data obtained are shown below. For the sake of comparison, dimethyl 1-carbomethoxy-1-propen-2-yl phosphate was also tested under these conditions and the results of the tests included.

*Table V*

| Toxicant | Lbs./acre | Percent mortality, days after spray | | | | | |
|---|---|---|---|---|---|---|---|
| | | 0 | 1 | 2 | 3 | 4 | 5 |
| Ethyl 2-methoxycarbonyl-1-methylvinyl (p-dimethylaminophenyl)-phosphonate | 0.8 | 100 | 97 | 57 | 65 | 77 | 40 |
| Dimethyl 1-carbomethoxy-1-propen-2-yl phosphate | 0.8 | 100 | 22 | | | | |

This application is a continuation-in-part of our copending application, Serial No. 333,006, filed January 23, 1953, now abandoned.

We claim as our invention:

1. A complex phosphonate of the formula

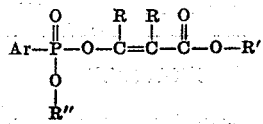

wherein Ar is an aryl radical chosen from the group consisting of phenyl, aminophenyl, di(lower alkyl) aminophenyl, (phenyl lower alkyl amino) phenyl, chlorophenyl and naphthyl, R is a member of the class consisting of hydrogen and alkyl radicals, R' is an alkyl radical, and R'' is an alkyl radical containing up to 6 carbon atoms.

2. Methyl 1-carbethoxy-1-propen-2-yl phenylphosphonate.

3. Methyl 1-carbomethoxy-1-propen-2-yl phenylphosphonate.

4. Ethyl 1-carbethoxy-1-propen-2-yl phenylphosphonate.

5. An alkyl 1-carbalkoxy-1-propen-2-yl aminophenylphosphonate said alkyl radical containing up to 6 carbon atoms.

6. An alkyl 1-carbalkoxy-1-propen-2-yl di(lower alkyl)-aminophenylphosphonate said alkyl radical containing up to 6 carbon atoms.

7. Ethyl 2-methoxycarbonyl-1-methylvinyl-(p-dimethylaminophenyl)phosphonate.

No references cited.